United States Patent
Larson

(10) Patent No.: US 10,466,774 B2
(45) Date of Patent: Nov. 5, 2019

(54) NTE DISPLAY SYSTEMS AND METHODS WITH OPTICAL TRACKERS

(71) Applicant: HONEYWELL INTERNATIONAL INC., Morris Plains, NJ (US)

(72) Inventor: Brent D Larson, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 213 days.

(21) Appl. No.: 15/358,383

(22) Filed: Nov. 22, 2016

(65) Prior Publication Data

US 2018/0143682 A1 May 24, 2018

(51) Int. Cl.
| | |
|---|---|
| G06F 3/01 | (2006.01) |
| G06T 7/00 | (2017.01) |
| G02B 27/32 | (2006.01) |
| G02B 27/01 | (2006.01) |

(Continued)

(52) U.S. Cl.
CPC ......... *G06F 3/012* (2013.01); *G02B 27/0093* (2013.01); *G02B 27/0172* (2013.01); *G02B 27/0179* (2013.01); *G02B 27/32* (2013.01); *G06T 7/74* (2017.01); *G02B 2027/014* (2013.01); *G02B 2027/0138* (2013.01);
(Continued)

(58) Field of Classification Search
CPC ...... G02B 2027/0138; G02B 2027/014; G02B 2027/0187; G02B 27/0093; G02B 27/0172; G02B 27/0179; G02B 27/32; G06F 3/012; G06T 2207/30204; G06T 7/0044

See application file for complete search history.

(56) References Cited

U.S. PATENT DOCUMENTS

| 5,742,263 A | 4/1998 | Wang et al. |
| 9,129,446 B2* | 9/2015 | Campbell ............... G06T 11/60 |
| 9,354,316 B2 | 5/2016 | Larson et al. |

(Continued)

FOREIGN PATENT DOCUMENTS

| EP | 2254023 A2 | 11/2010 |
| EP | 3211602 A1 | 8/2017 |
| WO | 2016063504 A1 | 4/2016 |

OTHER PUBLICATIONS

Owen, Charles B. et al. "Display-Relative Calibration for Optical See-Through Head-Mounted Displays," Proceedings of the Third IEEE, Jun. 2004.

(Continued)

*Primary Examiner* — Afroza Chowdhury
(74) *Attorney, Agent, or Firm* — Lorenz & Kopf, LLP

(57) ABSTRACT

An optical tracker system is provided for tracking a location and orientation of a first object. The system includes a prediction module configured to determine a predicted location and orientation of the first object as a spatial prediction; a display module configured to generate display commands for a fiducial symbol based on the spatial prediction; a display unit configured to display the fiducial symbol based on the display commands; a camera unit configured to capture an image of the fiducial symbol displayed on the display device as a captured appearance; and a position determination module coupled to the camera unit and configured to receive the image from camera unit. The position determination module is configured to identify the fiducial symbol and determine the location and the orientation of the first object based on the captured appearance of the fiducial symbol.

20 Claims, 7 Drawing Sheets

(51) Int. Cl.
  *G02B 27/00* (2006.01)
  *G06T 7/73* (2017.01)
(52) U.S. Cl.
  CPC ........... *G02B 2027/0187* (2013.01); *G06T 2207/30204* (2013.01)

(56) References Cited

U.S. PATENT DOCUMENTS

| | | | |
|---|---|---|---|
| 2010/0092079 A1* | 4/2010 | Aller | G06K 9/3216 382/165 |
| 2010/0259474 A1 | 10/2010 | Hildreth | |
| 2011/0300940 A1 | 12/2011 | Hsu et al. | |
| 2013/0109961 A1 | 5/2013 | Bose et al. | |
| 2015/0369593 A1* | 12/2015 | Myllykoski | G06T 7/73 348/136 |
| 2016/0269631 A1 | 9/2016 | Jiang et al. | |

OTHER PUBLICATIONS

Martinez, S., et al. High Speed, High Precision Size Degree-Of-Freedom Optical Tracker System and Method; Filed on Nov. 25, 2015 and assigned U.S. Appl. No. 14/951,805.
Extended EP Search Report for Application No. 17201268.4 dated Apr. 20, 2018.

* cited by examiner

NTE DISPLAY SYSTEMS AND METHODS WITH OPTICAL TRACKERS

TECHNICAL FIELD

The present invention generally relates to near-to-eye (NTE) display systems and methods, and more particularly relates to NTE display systems and methods with improved high speed, high precision optical trackers.

BACKGROUND

In recent years, near-to-eye (NTE) display systems have been developed and are becoming increasingly popular. Depending upon the particular end-use environment, these systems include NTE display units coupled to a helmet or headset of a user, and thus move with the changing location and angular orientation of the user's head. This advantageously allows the displayed information to be visible to the user regardless of the position, i.e. location and/or orientation of the head. It may thus be appreciated that tracking arrangements function to determine the location and orientation of the head in one or more degrees-of-freedom (e.g., x, y, and z, and pitch, yaw, and roll) in order to enable the overall functionality of an NTE display system. Known tracking technologies include inertial, magnetic, ultrasonic, and camera-based optical systems, although many such systems may be relatively complex, heavy, expensive, and/or lack satisfactory performance capabilities.

Accordingly, it is desirable to provide NTE display systems and methods with improved tracking capabilities. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

In accordance with an exemplary embodiment, an optical tracker system is provided for tracking a location and orientation of a first object. The system includes a prediction module configured to determine a predicted location and orientation of the first object as a spatial prediction; a display module coupled to the prediction module and configured to receive the spatial prediction, the display module configured to generate display commands for a fiducial symbol based on the spatial prediction; a display unit coupled to the prediction module and configured to receive the display commands, the display unit configured to display the fiducial symbol based on the display commands; a camera unit configured to capture an image of the fiducial symbol displayed on the display device as a captured appearance; and a position determination module coupled to the camera unit and configured to receive the image from camera unit. The position determination module is configured to identify the fiducial symbol and determine the location and the orientation of the first object based on the captured appearance of the fiducial symbol.

In accordance with another exemplary embodiment, a method is provided for tracking a location and orientation of a first object with an optical tracker system. The method includes determining a predicted location and orientation of the first object as a spatial prediction; generating display commands for a fiducial symbol based on the spatial prediction; displaying the fiducial symbol based on the display commands on a display device; capturing an image of the fiducial symbol displayed on the display device as a captured appearance; and identifying the fiducial symbol in the image; and determining the location and the orientation of the first object based on the captured appearance of the fiducial symbol.

In accordance with yet another exemplary embodiment, a near-to-eye display system is provided. The NTE system includes an optical tracker system for tracking a location and orientation of a first object. The NTE system includes a first display unit with an active matrix display device and configured to display a fiducial symbol based on first display commands; a camera unit configured to capture an image of the fiducial symbol displayed on the first display device as a captured appearance; and a position determination module coupled to the camera unit and configured to receive the image from camera unit. The position determination module is configured to identify the fiducial symbol and determine the location and the orientation of the first object based on the captured appearance of the fiducial symbol. The NTE system includes a drive unit coupled to the optical tracker system and configured to generate second display commands based on the location and the orientation of the first object and a second display unit coupled to the drive unit and configured to render symbology based on the second display commands for viewing by a user relative to a surrounding environment.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the exemplary embodiments described below, near-to-eye (NTE) display systems and methods are used to track the spatial characteristics of a head of a user to determine a visual perspective of the user, although other objects and body parts may be tracked. Generally, the terms "spatial characteristics" and "position" as used herein refer to one or more of the location and/or orientation values. For example, the spatial characteristics may include location values, such as the translational values in three-dimensional space, e.g., along an x-axis, a y-axis, and a z-axis in a Cartesian coordinate system. The spatial characteristics may further include orientation or angular values, such as the Euler angles commonly known as pitch, yaw, and roll. Any of numerous other known orientational representations may alternately be used, including but not limited to direction cosines, polar representations, quaternions, or the like. In one exemplary embodiment, the NTE system may consider six of these spatial characteristics and therefore may be considered a six degree-of-freedom (DOF) NTE system. In other embodiments, the NTE system may only consider an individual or subset of these spatial characteristics, or may include additional degrees of freedom such as relative relationships between multiple components within the NTE system.

Figure 1:
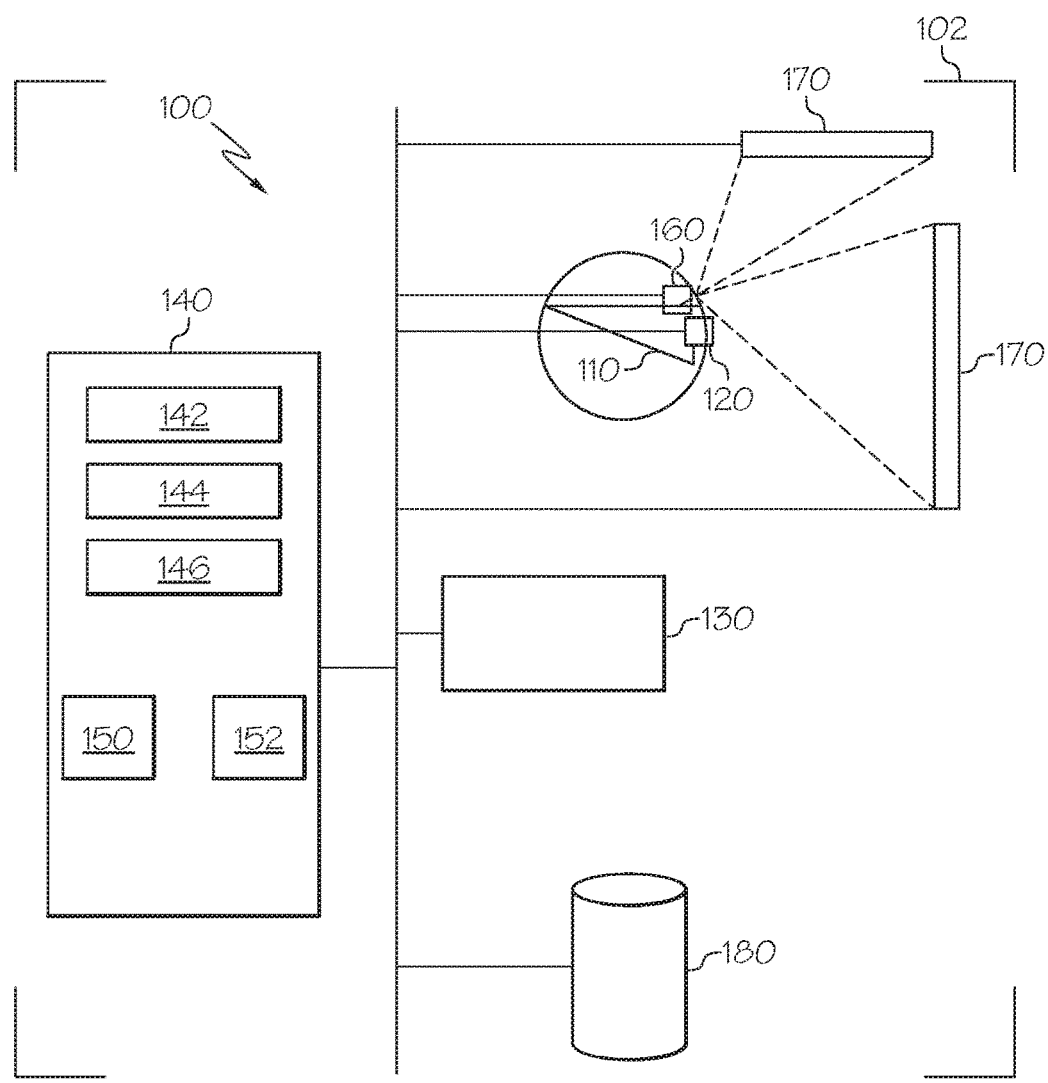
FIG. 1 is a functional block diagram of an NTE system in accordance with an exemplary embodiment.

Referring now to FIG. 1, a functional block diagram of one embodiment of a near-to-eye (NTE) system 100 is depicted, and includes an NTE structure 110, a structure display unit 120, an NTE drive unit 130, an NTE tracker control unit 140, one or more camera units 160, one or more tracker display units 170, and one or more data sources 180. Generally, the NTE system 100 is arranged within an operational environment 102, such as a flight deck. In one exemplary embodiment, the NTE tracker control unit 140, in combination with one or more of the camera unit 160 and tracker display units 170, may be considered an optical tracker or tracking system or an optical tracker. Generally, the elements of the system 100 may be coupled together in any suitable manner, such as with a wired and/or wireless data bus. Although the NTE system 100 appears in FIG. 1 to be arranged as an integrated system, the NTE system 100 is not so limited and can also include an arrangement whereby one or more aspects of the NTE system 100 are separate components or subcomponents of another system. It should also be noted that FIG. 1 presents simplified representations of the NTE system 100 for purposes of explanation and ease of description, and FIG. 1 is not intended to limit the application or scope of the subject matter in any way. In practice, the NTE system 100 may include numerous other devices, components, and characteristics for providing additional functions and features, as will be appreciated by those skilled in the art.

In one exemplary embodiment, the NTE system 100 is embodied as a head-up-display (HUD) in which the NTE structure 110 is worn by the user and supports a semitransparent or transparent structure display unit 120 that renders symbology for viewing by the user relative to the surrounding environment based on signals from the NTE drive unit 130, NTE tracker control unit 140, and data sources 180. The symbology may include any image content intended to be viewable by the user, and some or all of that symbology may be selected or generated based in part on the position of the NTE structure 110. For example, symbols may be rendered to be conformal with the surrounding environment, such that the conformal symbols overlay corresponding regions or features in the environment when viewed through the head-up-display. In order to register and display the symbology at the appropriate positions, the NTE tracker control unit 140 determines the location and orientation of the NTE structure 110, and thus the perspective of the user, by evaluating images of fiducial symbols displayed on the tracker display units 170 and captured by the camera unit 160 mounted on the NTE structure 110. Each component of the NTE system 100 will be introduced below prior to a more detailed description of operation, particularly operation of the NTE tracker control unit 140. Although the NTE system 100 is described with respect to an aircraft and utilized by an aircraft operator, generically referenced below as a "user" or "viewer", exemplary embodiments may be used in other contexts, such as military vehicles or handheld device trackers.

In one exemplary embodiment, the NTE structure 110 may be any structure positioned near one or both eyes of a user. For example, the NTE structure 110 is generally worn by the user, e.g., in the form of glasses, goggles, or helmet-mounted screen. It will be appreciated that the NTE structure 110 may vary in configuration and implementation. In one particular embodiment, which is depicted in FIG. 1, the NTE structure 110 is a visor that is configured to be positioned on the head of a human user.

The structure display unit 120 is supported by the NTE structure 110 to be positioned in front of one or more eyes of the user. The structure display unit 120 is any suitable display component that displays virtual images while still allowing the user to view the real world. For example, the structure display unit 120 may employ, for instance, any type of projection or micro-display technology presented via a transparent or semitransparent screen to provide the virtual images superimposed on the visible scene. In one exemplary embodiment, a structure display unit 120 can provide a representative view of a scene outside the vehicle for use by the vehicle operator even in poor visibility conditions, such as thick fog conditions. Exemplary technologies include, for example, an optical combiner element with collimating optics and a microdisplay (such as a liquid crystal display (LCD), liquid crystal on silicon (LCoS) display, or organic light emitting diode (OLED) display). Other technologies may also be employed, such as retinal displays in which images are projected directly onto the retina while the user is viewing the real world. Symbols displayed on the structure display unit 120 will appear as virtual images visible to the user while looking through the combiner. The virtual images may be computer-generated, but may also come at least in part from other data sources 180 such as imaging sensors, image transmissions or image storage devices.

The NTE drive unit 130 provides display signals to the structure display unit 120 to generate desired symbology or display elements in the appropriate location on the structure display unit 120 relative to the real-world visible scene. For some types of symbology, the position on the structure display unit 120 may be fixed, e.g., always in a particular place. For other types of symbology, such as traffic and terrain information, the display elements are a function of the real-world environment relative to the current perspective of the user. As such, the NTE drive unit 130 uses spatial characteristics from the tracker control unit 140 to register and position this symbology in appropriate positions on and with respect to the structure display unit 120.

The NTE drive unit 130 may render any suitable type of symbology on the structure display unit 120 based on information from various types of data sources 180 (e.g., a navigation system, flight management system, warning system, and communications unit). For example, in the context of an aircraft, the symbology provided on the structure display unit 120 may include navigational or operational symbology, including traffic and/or terrain information, speeds, altitudes, attitudes, flight path and plan information, and the like.

The tracker display units 170 include one or more display devices arranged within the operational environment 102 separated from the NTE structure 110. The tracker display unit 170 functions to display images that contain at least one fiducial symbol (or multiple fiducial symbols). Typically, the tracker display units 170 are positioned at fixed locations such that the camera unit 160 captures at least a portion of the images displayed thereon. Such images include the fiducial symbol from which the NTE tracker control unit 140 may derive the spatial characteristics of the user, as described in greater detail below. In some embodiments, the tracker display units 170 may receive display signals from the NTE tracker control unit 140 that control the appearance of the fiducial symbols, as also described below.

Generally, the tracker display units 170 may be arranged in any suitable position within the operational environment 102. In the depicted embodiment, one of the tracker display units 170 is arranged in front of the user, and another tracker display unit 170 is arranged above the user. In some embodiments, only a single tracker display unit 170 may be provided. In practice, the tracker display units 170 may be located anywhere with a line of sight to the camera unit 160, although certain positions may have advantages with respect to particular spatial characteristics.

For reasons described in greater detail below, the tracker display units 170 may be active matrix displays, particularly those that provide display stability and lithographic precision for symbol detail and separation to achieve precise and repeatable tracking results. Lithographic precision is taken to mean the ultra-high precision, accuracy and repeatability achieved by techniques such as optical or UV photolithography, electron beam lithography, ion beam lithography, or the like, as are commonly employed in the fabrication of integrated circuitry and/or active matrix displays. In the embodiments described below, the active matrix tracker display units 170 enable the display of fiducial symbols in a manner well beyond that achievable with simple physical markings or individual, larger LED emitters.

As examples, the tracker display units 170 may include active matrix LCD and/or active matrix LED displays with small pixel sizes and sub-micron or better precision over extended areas, and although such displays typically have protective layers intervening between the pixel pattern and the camera unit 160 (e.g. glass substrate, polarizers, etc.), such layers are generally consistent across the display area, thereby enabling the tracking functionality. Further characteristics may include a display unit 170 built upon a single extended substrate, lithographically patterned, emissive, backlit or locally frontlit, and not requiring remotely generated and directed front or ambient illumination, on or behind a glass and/or transparent substrate, having submicron precision patterning, high resolution, high contrast, high local uniform output luminance/radiance, exceptional feature linearity, or similar. In addition to the extreme two-dimensional precision and stability, the stability and precision in the axis normal to the surface of tracker display units 170 may also be controlled to the extent desired, for example by the choice of substrate material, thickness and/or flatness. Thermal expansion or uniformity can be controlled if desired by appropriate monitoring and feedback using one or more appropriate heating or cooling elements.

In one exemplary embodiment, one or both of the tracker display units 170 are dedicated display panels that function to support the determination of spatial characteristics. In other exemplary embodiments, one or both of the tracker display units 170 may additionally be used for display functions already available in the flight deck or environment 102, such as an avionic head down display (HDD), thereby providing dual functionality with little or no installation of additional hardware.

As noted above, the camera unit 160 is mounted on the NTE structure 110 that is disposed on and moveable with the user. Typically, the camera unit 160 is disposed at specified reference positions on the structure 110 such that the perspective of the user may be readily derived from the perspective of the camera unit 160. As an example, the camera unit 160 is a compact, high resolution camera. In some embodiments, multiple camera units 160 may be employed. During operation, the camera unit 160 functions to capture images of the environment 102, particularly the images displayed on the tracker display units 170, and the camera unit 160 provides these images to the tracker control unit 140.

The tracker control unit 140 may be considered to include one or more functional units or modules 142, 144, and 146 (e.g., software, hardware, or combinations thereof). As an example, each of the modules 142, 144, and 146 may be implemented by or with a processor 150 and memory 152. In the depicted embodiment, the tracker control unit 140 includes a position determination module 142, a prediction module 144, and a display module 146. FIG. 1 depicts one exemplary organization, and other embodiments may perform similar functions with alternative organization or implementation. In the discussion below, the tracker control unit 140 may be considered to operate in iterations, cycles, or frames in which certain functions occur. Generically, these time periods are referenced below as frames.

As introduced above, a primary function of the tracker control unit 140 is to determine the perspective of the user such that the symbology displayed on the structure display unit 120 may be accurately positioned. Accordingly, the position determination module 142 generally functions to identify a fiducial symbol from the image provided by the camera unit 160 and determine the spatial characteristics of the NTE structure 110, and thus the perspective of the user, from the appearance of the fiducial symbol in the captured image. A further function of the tracker control unit 140 is to control the appearance of the fiducial symbols on the tracker display unit 170 in a manner that facilitates the determination of spatial characteristics. As such, the tracker control unit 140 further includes the prediction module 144 that predicts the spatial characteristics of the user during the next frame, and the display module 146 that commands the appearance of the fiducial symbol during the next frame in a manner that facilitates identification and evaluation. Additional details about operation of these modules 142, 144, 146 will be provided below.

As noted above, the tracker control unit 140 (as well as other components of system 100) may be implemented with a computer processor 150, including general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the NTE tracker control unit 140 further includes computer processor 150 and memory 152 that may be configured to carry out the functions, techniques, and processing tasks or methods associated with operation of the NTE tracker control unit 140. The memory 152 may store computer readable instructions, firmware and software programs and be tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

In addition to the camera unit 160, the NTE tracker control unit 140 may receive information from one or more additional sensors on or separate from the structure 110 that provide positional and orientation data. Such sensors may include GPS sensors, inertial measurement unit (IMU) sensors, depth sensors, eye tracking sensors, microphones, biometric sensors, and other types of sensors.

Now that the system 100 has been introduced, a more detailed description of the operation of the NTE tracker control unit 140 will now be described. A relatively simple example of operation is described with reference to FIGS. 2 and 3, which depict examples of a fiducial symbol 200 rendered on a tracker display unit 170 having a perimeter 202.

Generally, the fiducial symbol 200 is a symbol that enables observations of changes in appearance upon changes in spatial characteristics of the structure. In these examples, the fiducial symbol 200 is a grid of intersecting lines in which each crossing represents a potential fiducial marking that may be identified and evaluated by the tracker control unit 140. Any suitable fiducial symbol may be used. Generally, however, it is beneficial for the fiducial symbols 200 to have distinct edges and have well-separated markings or features, such as the high precision patterned substrate or mask of FIG. 2, that enable the distinguishing of translational effects from orientational effects, as described in greater detail below. The fiducial symbols are preferably either self-emissive or locally backlit or frontlit, and may be visual or non-visual, such as infra-red or ultraviolet. Typically, the fiducial symbol is selected to facilitate identification and evaluation by the NTE tracker control unit 140, as described below.

Figure 2:
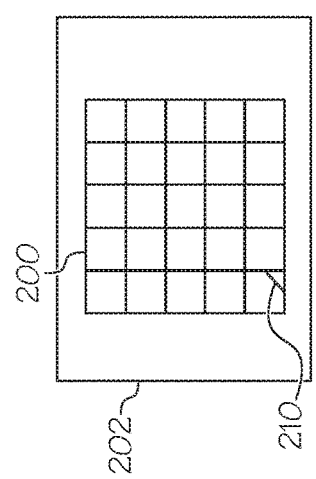
FIG. 2 is a first view of a fiducial symbol on a tracker display unit in accordance with an exemplary embodiment.

FIG. 2 is a view of the fiducial symbol 200 from a first perspective. In the particular example of FIG. 2, the first perspective corresponds to an origin, center, or baseline position of the user, as indicated by the regular rectangular nature of the perimeter 202 of the tracker display unit 170. Generally, the first perspective is a perspective with known spatial characteristics.

In this example, FIG. 2 also depicts the nominal appearance of the fiducial symbol 200. The nominal appearance of the fiducial symbol (or nominal fiducial symbol) is a baseline appearance from which deviations may be identified and evaluated to determine any changes in location or orientation, as described in greater detail below. Generally, the nominal appearance of the fiducial symbol is selected to facilitate derivations of the spatial characteristics based on the image of the fiducial symbol, having the desirable characteristics described above for fiducial symbol 200. It is also preferred that fiducial symbol 200 contain one or more symmetry-breaking (or non-symmetrical) features 210 which eliminate orientational or translational ambiguity associated with detection of the symbol. Feature 210 as shown is simplified for clarity and not intended to be limiting. In practice, symmetry-breaking features would preferably be included throughout a grid structure such as that in FIG. 2, and would also vary from crossing to crossing to remove both translational and rotational ambiguity. This is particularly relevant for situations where only a portion of fiducial symbol 200 will be detected by camera unit 160.

Figure 3:
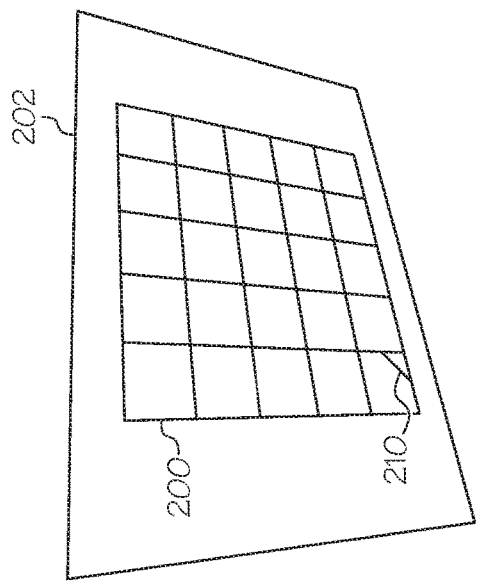
FIG. 3 is a second view of a fiducial symbol on a tracker display unit in accordance with an exemplary embodiment.

FIG. 3 is a view of the fiducial symbol from a second perspective. The second perspective corresponds to an unknown perspective, for example, one resulting from a movement of the structure 110 and camera unit 160 upon movement of the user. In the example of FIG. 3, the user is closer to the display unit 170 and viewing the display unit 170 from the upper left as compared with FIG. 2, aiming down and to the right with a slight roll, as indicated by the distorted or skewed appearance of the perimeter 202 of the display unit 170. As a result of this movement, the appearance of the fiducial symbol 200 is also skewed relative to the nominal appearance of the fiducial symbol 200 in FIG. 2.

During operation, the NTE tracker control unit 140 receives the image of the fiducial symbol 200 from the camera unit 160 at the second, unknown perspective, such as that shown in FIG. 3 to result in an image with a fiducial symbol having a "captured appearance." The NTE tracker control unit 140 identifies and evaluates the fiducial symbol 200 in order to determine the spatial characteristics of the camera unit 160 (and thus, the structure 110 and the user) based on the captured appearance of the fiducial symbol 200.

The NTE tracker control unit 140 may determine the spatial characteristics from the fiducial symbol 200 in any suitable manner. This task of estimating the 3D pose or position of an object from a camera-captured 2D is often referred to as Perspective-n-Point (PnP) estimation. Techniques range from analytic solutions using a minimal data set to statistical and iterative solutions using large numbers of sampled points.

In one exemplary embodiment, the position determination module 142 of the tracker control unit 140 receives images from the camera unit 160 and compares captured appearance of the fiducial symbol from the perspective of unknown spatial characteristics (e.g., at the position and orientation upon possible movement of the structure) to the nominal appearance of a fiducial symbol from perspectives of known spatial characteristics (e.g., at known positions and orientations). From this comparison, the position determination module 142 may identify the discrepancies, and from these discrepancies, the position determination module 142 may derive the spatial characteristics at the second, previously unknown perspective.

It will be appreciated that the position determination module 142 could implement any one of numerous techniques to determine spatial characteristics. Such techniques or models may include geometric analysis, such as triangulation or related algorithms stored in the position determination module 142. One particular technique is disclosed in D. DeMenthon and L. S. Davis, "Model-Based Object Pose in 25 Lines of Code," International Journal of Computer Vision, 15, pp. 123-141, June 1995, and is referred to therein as "POSIT." Another technique is described in V. Lepetit, F. Moreno-Noguer and P. Fua, "EPnP: An Accurate O(n) Solution to the PnP Problem," International Journal of Computer Vision, vol. 81, pp. 155-166, 2009. As a further example, standard triangulation techniques may be employed for measuring the characteristics of the fiducial symbol in the image in order to determine the relative translational and orientational relationships between the fiducial symbol and the camera unit 160 capturing the image. One example would be to condense measurements into six independent metrics and apply a suitable transformation that converts those condensed metrics into the desired DOF metrics. Another exemplary method would be to calculate a numerical fit of an oversampled system, and use the oversampling to average out or filter any potential noise in the sampled data, provide redundancy (e.g., if one or more emitters get blocked or encounters anomalous signal levels due to spurious reflections or other situations), or enhance sensitivity in certain geometric relationships (e.g., spatial vs. angular sensitivities). Additional signal processing methods may also be used to improve the extracted DOF metrics, for example by including temporal characteristics of the measurements.

In one exemplary embodiment, the position determination module 142 determines spatial characteristics with six degrees-of-freedom (the x, y, and z positions and the pitch, yaw, and roll orientations). In further embodiments, only a subset of these spatial characteristics may be identified. Further, derivatives of these spatial characteristics may be derived, such as velocity, acceleration, and jerk, as necessary or desired.

As noted above, in the example of FIGS. 2 and 3, the fiducial symbol 200 has a nominal appearance at the first perspective, which in this case is the origin. In the example above, the nominal appearance is fixed relative to the origin. In other words, the fiducial symbol 200 is stationary relative to the tracker display unit 170 and displayed in a consistent, constant manner such that the fiducial symbol 200 always has the nominal appearance at the first perspective and a skewed appearance at the second perspective. Many benefits of using a lithographically produced matrix display to generate fiducial symbol 200 have been introduced above. In the case of a static or stationary fiducial symbol as shown in FIGS. 2 and 3, one alternate exemplary embodiment would be to forego the dynamic image generation capability and simply display the static image, even possibly patterning the static image lithographically on the emissive or light-modulating substrate.

Referring again to FIG. 1, the NTE tracker control unit 140 further includes the prediction module 144 configured to anticipate the spatial characteristics of the user during the next frame. These future spatial characteristics are referred to below as a "spatial prediction." As also noted above, the NTE tracker control unit 140 is also coupled to the tracker display units 170 to actively control the appearance of the displayed fiducial symbols. In particular, the display module 146 of the NTE tracker control unit 140 generates display commands that adjust, orient and position the fiducial symbols on the tracker display units 170 based on the spatial prediction. Accordingly, NTE tracker control unit 140 may further generate a nominal fiducial symbol with reference to predicted spatial characteristics of the structure 110. In other words, the nominal appearance of the fiducial symbol is not fixed relative to a specific, fixed position or origin, but instead, the nominal fiducial symbol is context dependent based on the predicted position and/or orientation of the structure 110, as described below The prediction module 144 may generate spatial prediction based on any number of parameters. For example, the prediction module 144 may determine the spatial prediction based on trends or extrapolation of previous spatial characteristics. In one embodiment, a simple linear extrapolation is used, e.g., by adding some or all of the most recently measured change in spatial characteristics to the current spatial characteristics to generate the spatial prediction. In other embodiments, higher order techniques such as quadratic estimation may be used, including known techniques such as Kalman filtering and extensions thereof. The spatial prediction may take into account higher order derivatives of the motion, estimated or derived from recent measurement history, and may also consider characteristic head motion dynamics of a typical user and within the operational environment 102. While some of these prediction module embodiments utilize data from two or more frames, this is not intended to be limiting. In another embodiment, prediction module 144 uses the spatial characteristics of a single previous frame as the spatial prediction for the next frame. With an suitable fiducial symbol this can be simple but very effective, especially when the change in spatial characteristics from frame to frame is not excessive. In certain embodiments the prediction module 144 may also utilize the average of multiple previous frames, such as when the changes in spatial characteristics over those previous frames is small, and may optionally switch to another estimation method when a larger change in spatial characteristics is detected. In still further embodiments, the prediction module 144 may generate spatial prediction based on other inputs such as a secondary tracker mechanism.

Figure 5:
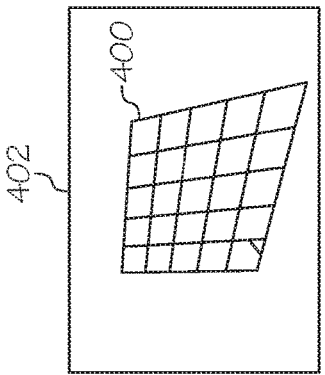
FIG. 5 is a fourth view of a fiducial symbol on a tracker display unit in accordance with an exemplary embodiment.
Figure 4:
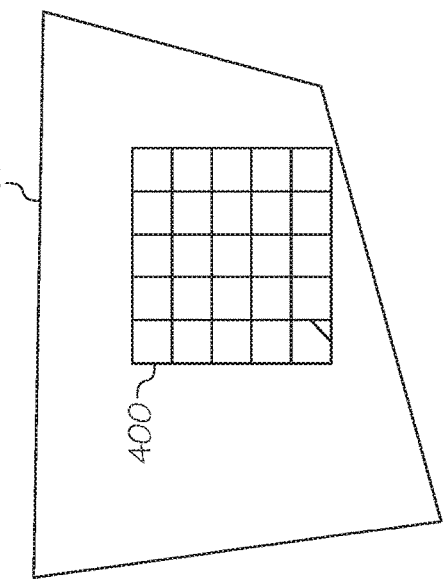
FIG. 4 is a third view of a fiducial symbol on a tracker display unit in accordance with an exemplary embodiment.

An example of the fiducial symbol resulting from the spatial prediction is depicted by a comparison of FIGS. 4 and 5. FIG. 4 depicts a view of a fiducial symbol 400 within an image perimeter 402 of the display unit 170 from the perspective of the spatial prediction. Specifically in this embodiment, the fiducial symbol 400 is displayed to have the nominal appearance when viewed or captured from the anticipated location and orientation. The anticipated location and orientation of the spatial prediction has known spatial characteristics, but the movements resulting in the spatial characteristics are anticipated. As shown, the image perimeter 402 is skewed because the user is viewing the image from the perspective of the spatial prediction (e.g., not from the perspective of the origin). However, the fiducial symbol 400 has a nominal appearance, as indicated by the regular, even appearance of the grid that forms the fiducial symbol 400. For reference, FIG. 5 is a view of the same fiducial symbol 400 within the image perimeter 402 of the display unit 170 from the perspective of the origin, which in this example is not the current or predicted perspective of the user, but is merely depicted for comparison purposes. In this view, the fiducial symbol 400 appears to be skewed since the fiducial symbol 400 is rendered for a nominal appearance from the spatial prediction, not the origin.

Referring again to FIG. 1, upon making the spatial prediction and displaying the fiducial symbol (e.g., fiducial symbol 400 of FIG. 4) according to the spatial prediction, the camera unit 160 captures the image of the fiducial symbol from the actual location and orientation of the user. Upon receipt of the image, position determination module 142 identifies and evaluates the fiducial symbol extracted from the image. In particular, the position determination module 142 compares the fiducial symbol in the image to the nominal fiducial symbol of known spatial characteristics. If the fiducial symbol in the image has a nominal appearance, then the position determination module 142 identifies the spatial prediction as the current spatial characteristics. If the fiducial symbol in the captured image has an appearance that is different than nominal, the position determination module 142 identifies the discrepancies and determines the current spatial characteristics based on those discrepancies, for example, similar to the process described above.

The active control of the fiducial symbol from frame to frame provides particular advantages. For example, each frame may enable fiducial symbols tailored for the best advantages. The result of the active control in the embodiment of FIGS. 4 and 5 is that the fiducial symbol, as captured by the camera, would appear generally the same from frame to frame. The symbol, in effect, is "pre-skewed" or pre-distorted relative to the origin, but nominal relative to the anticipated perspective. There would only be deviations from that nominal pattern if the predicted camera 6-DOF position differed from the actual position. This approach can greatly simplify the pattern matching and analysis algorithms. By actively controlling the fiducial symbol, the range of geometries and relationships required for fiducial based pattern recognition is reduced. By moving the geometric manipulations and calculations to the "pre-processing" of the symbol rather than "post-processing" of the captured image, the detection step is simplified. Additional advantages may also be realized. For example, the perimeter of the grid may be used to find an estimated deviation from ideal, which may then enable a much more redundant set of data to be extracted from the image and processed. This could include, for example, thousands of pixel locations within or around the grid from which to average and improve overall precision, and knowing where to look for each of those points with minimal searching or ambiguity. While FIG. 4 shows one grid, multiple smaller symbols may be distributed over the area, for example in each corner of the current field of view (FOV) overlap of the display and camera.

Although the most apparent distinction between FIGS. 4 and 5 is the orientation and shape of the fiducial symbol 400, other variations in appearance may be provided to enhance the ability to determine spatial characteristics. For example, the location, size, shape, color, update rate, and other characteristics may also be dependent on the spatial prediction of the user. As a specific example, in relatively large tracker display units 170, the fiducial symbol may be placed in a position on the screen that is closest to the spatial prediction of the user, or in a position on the screen chosen to be within the field of view of camera unit 160. However, other variations may be provided, such as tailored use of use of color, sub-pixel detail (both display and camera), monochrome/narrow bandwidth operation, image smoothing or sensor band limiting techniques. In certain embodiments, techniques commonly leveraged to enhance aesthetic visual image quality may be bypassed, for example, deliberately allowing and leveraging information such as Moiré effects that may useful for the tracking function.

In some embodiments, the tracker control unit 140 may display fiducial symbols on the tracker display units 170 based on additional parameters, e.g., in addition to the spatial prediction of the user. For example, fiducial symbols may be selected based on the platform, the range of motion, the camera unit, and/or display characteristics.

FIGS. 2-5 clearly demonstrate that one of the possible effects of altering the spatial characteristics, especially the orientation, of the fiducial symbol is the apparent skewing of the fiducial symbol relative to its nominal shape. For example, changing the orientation of a square symbol about one of its sides, or in-plane axes, can result in an apparent trapezoidal shape, with one side appearing shorter than the other side due to its increased distance from a viewer or camera unit 160. The ability to detect a given amount of orientation difference is dependent upon a number of detailed factors and considerations, but this simple example can be used to obtain a first-order estimate of certain preferred characteristics of tracker display unit 170 in the context of the present invention. For a square fiducial symbol of width W and located at a distance D from camera unit 160 at the origin, a small change in orientation angle A as described results in a trapezoidal image, with one side of the square approximately $W \times \sin(A)$ closer to the camera than the opposite side, or approximately $W \times A$, if A is quite small and measured in radians. This results in the closer side appearing to be of height $W \times ((D+WA)/D)$, as compared with the opposite side of height W. The fractional change is therefore $(W \times (1+AW/D) - W)/W = AW/D$. As an example, setting A, W and D to 5 milliradians, 200 mm and 500 mm respectively results in an apparent change of around 1/500, or 0.2%. Resolving this level of detail in general suggests the use of pixels of the same size or smaller, i.e. approximately 500 pixels or more along the distance W, implying a pixelated matrix display having a minimum of 500×500 precise and uniformly spaced pixels. Higher pixel counts may be used, for example 1000×1000, 2000×2000 or 4000×4000, to enable resolving smaller angles, using smaller tracker display units, larger tracking distances and providing generally improved performance and flexibility. For the same reasons, the apparent optical depth or thickness of the pixels may be substantially smaller than the lateral pixel dimension to minimize degradation of effective resolution as a function of angle.

In a further embodiment, the NTE tracker control unit 140 may include a compensation module to further or alternatively modify the appearance of the fiducial symbol based on other factors. Particularly, the compensation module may modify the appearance of the fiducial symbol based on potential sources of error, such as distortion in the camera mapping (e.g., barrel or pincushion distortion), display deviations in flatness, and/or refraction effects through any intervening substrates or surfaces. By estimating and compensating for those potential errors in the pre-processing stage, it substantially reduces or eliminates the need to consider those effects in the pattern matching algorithms, which could reduce the processing complexity tremendously. Lens distortion and aberrations, vignetting, and sensor alignment can easily degrade performance and should therefore be accounted for when high accuracy is required. These can be modeled or separately characterized, with the characteristics stored and applied in one or both of the pre-processing and post-processing stages. Refraction effects, e.g., through transparent display substrates, are generally understood. These can vary significantly throughout the potential tracking range, but may vary smoothly and be suitable for compensation in the pre-processing stage. Still other sources of potential errors may be more difficult to fully characterize separately, but the combination of adjustable fiducials, the extreme precision and linearity of a display matrix structure, and the compensation module can be used to detect and adjust for such effects in a manner concurrent with the tracking function.

In one embodiment, the compensation module separately examines the linearity of detected lines and symbols displayed on the display unit 170, such as the grid lines 200 and 400 in FIGS. 2-5, and uses multiple such measurements and known optical ray tracing techniques to develop a characteristic description of the flatness profile of display unit 170. This description, for example in the form of a polynomial-based surface flatness model, may then be made available and periodically updated if appropriate. The flatness model may be used to improve the precision of the pre-processing and/or post-processing functions. The adjustability of the displayed symbols enhances the ability to fully characterize what may otherwise limit the accuracy and precision of the tracker output. The compensation module may also have access to the statistical errors, residuals or merit function resulting from any oversampling in the determination of the spatial characteristics by the position determination module 142 may be used as feedback for improving the determination of results.

As previously mentioned, one exemplary embodiment may utilize one or more tracker display units 170 to additionally provide user-viewable symbology intended for direct viewing by the user, for example display unit 170 positioned in front of and slightly below the forward line of sight of the viewer. In this embodiment, symbols for the tracker may be presented in unused areas of said display unit 170, such as statically placed fiducials in the corners of the display area. Alternately, fiducial symbols may be incorporated within the user-viewable symbology in a non-distracting manner, or may even be the same symbols provided to the viewer. In this latter case, the direct signal connection may be optional, allowing the camera-based tracker assembly to reference off of those symbols, especially those that are consistent or predictable. Other custom designs are also possible, such as a dual visible/NIR output set, e.g. time-modulated as in a stereo monitor using a fast AMOLED or AMLCD panel. Standard spectral filtering and/or temporal phase-sensitive detection methods may be employed to isolate the fiducial symbols from other symbology.

Figure 6:
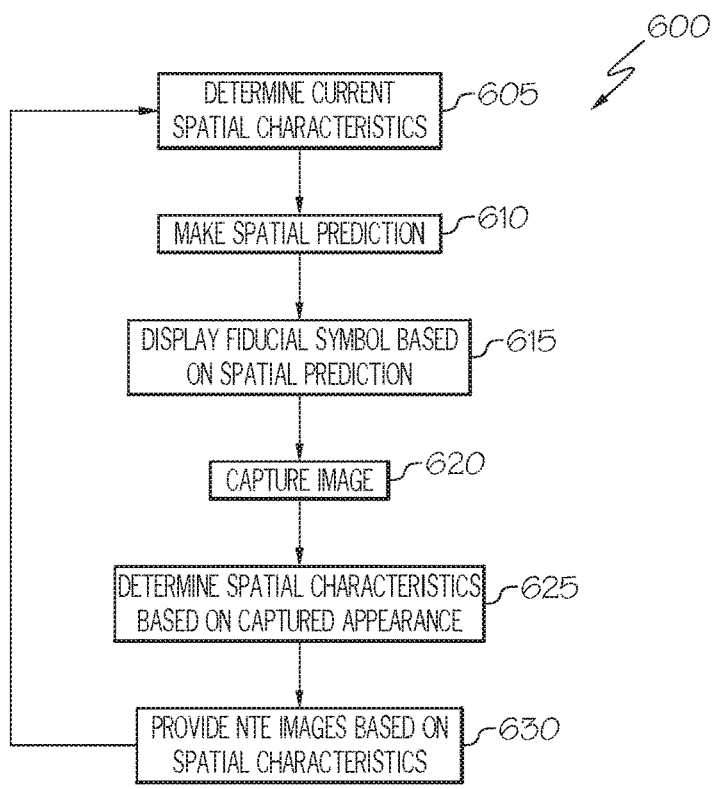
FIG. 6 is a flowchart of a method for providing an NTE display in accordance with an exemplary embodiment.

FIG. 6 is a flow chart that illustrates an exemplary embodiment of a method 600 suitable for use with exemplary embodiments described herein. The various tasks performed in connection with method 600 may be performed by software, hardware, firmware, or any combination thereof. For illustrative purposes, the following description of method 600 may refer to elements mentioned above in connection with preceding FIGS. In practice, portions of method 600 may be performed by different elements of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

In a first step 605, current spatial characteristics of the user are determined or otherwise acquired by the tracker control unit 140. The current spatial characteristics may be determined in any suitable manner, including from previous determinations. In some embodiments, the current spatial characteristics may be determined by commanding the tracker display units 170 to display a fiducial symbol that has a nominal appearance with respect to an origin or other perspective with known spatial characteristics such that the current spatial characteristics may be determined, e.g., similar to the functions described above with reference to FIGS. 2 and 3.

In step 610, a spatial prediction of the user is determined for the next frame or time period by the tracker control unit 140. In step 615, display commands are generated to display a fiducial symbol on the tracker display units 170 that is at least for some frames or time periods different from the previous fiducial symbol. In one example, the fiducial symbol displayed is such that the nominal appearance of the fiducial symbol is from the perspective of the spatial prediction.

In step 620, an image of the fiducial symbol is captured by a camera unit 160. In step 625, the captured appearance of the fiducial symbol is analyzed, e.g., compared to the nominal appearance, in order to determine the spatial characteristics of the user. In step 630, the NTE drive unit 130 generates display commands for the structure display unit 120 based on the spatial characteristics such that the user may view the displayed symbology in the appropriate positions.

Subsequently, the method 600 returns to step 605 such that the tracker control unit 140 continues to actively manage the appearance of the fiducial symbols and to determine updated spatial characteristics of the user.

Figure 7:
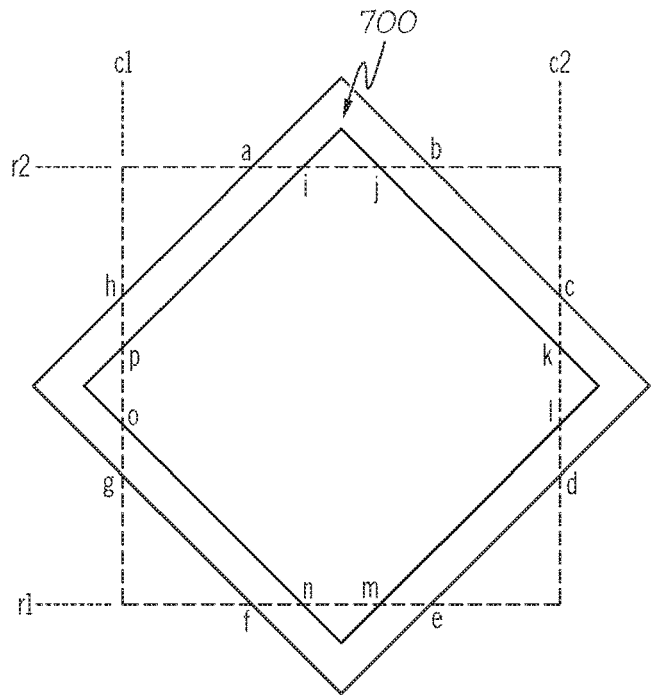
FIG. 7 is a further example of a fiducial symbol in accordance with an exemplary embodiment.

Although FIGS. 2-5 depict one example of fiducial symbols where the symbols are advantageously modified in based on the tracked spatial characteristics, many other types of fiducial symbols may be provided and used in different contexts. FIG. 7 is a fiducial symbol 700 implemented in an exemplary embodiment to facilitate direct feature detection. In FIG. 7, the fiducial symbol 700 is a nested pair of rotated solid line squares or more generally, nested pair (or more) of rotated fiducial symbols. Target lines r1, r2, c1, c2 represent selected, fixed individual rows and columns of pixels within the camera image. Upon receiving the image, the NTE tracker control unit 140 identifies one or more of the intersections a-p of the lines r1, r2, c1, c2 and squares of the fiducial symbol 700, which may be accomplished in a relatively simple manner by searching the target lines r1, r2, c1, c2 in the expected vicinity to locate the peaks in image brightness along those rows and columns. If quantization error or defocus is a concern, those can be alleviated by a simple local weighted summing technique. The result in this basic example is a set of up to sixteen measured values associated with the intersections, as r1, r2, c1, c2 are predetermined and not measured. From this set of values, six degrees of freedom may be extracted, even though no point on the display is uniquely characterized in both h and v. Rather than doing a 2D search for grid crossings, or invoking trigonometric functions to trace oblique lines or curves, maintaining a relationship such as this allows a simple linear search to be used instead.

Converting the values r1, r2, c1, c2 and a-p into the tracked spatial characteristics can be done using similar methods as previously described. For example, each corner of each square of the symbol 700 may easily be located and characterized by simply solving for the intersections of the corresponding two lines. The line through points a and h will intersect the line through b and c to yield the uppermost corner in symbol 700 as captured by camera unit 160. From the eight corners, or a sufficient subset thereof, the spatial characteristics to be tracked may be solved for, whether by a nonlinear least squares minimization of a corresponding merit function, algebraically, or other such method.

The ability to adjust the fiducial symbol from frame to frame as the spatial characteristics change again provides flexibility in optimizing performance. As such, during generation of the fiducial symbol, the apparent orientation, angle(s), sizes and other aspects may be maintained as desired as perspective changes such that the NTE tracker control unit 140 is required to simply look for deviations from the anticipated values, even possibly treating things using linear or quadratic approximations if motion effects are small enough from frame to frame. The number of squares or other features within the symbol may be varied dynamically as desired. A further variation includes adjusting the slopes of the lines to change the relative directional sensitivity of the test points. As imaging sensor resolutions increase, the signal bandwidth required for data transfer and analysis also increases. The methods described here allow emphasis on specific areas or regions of interest within the field of view or coverage area of camera unit 160. With many camera sensors, this enables operation at significantly higher frame rates than when larger areas must be captured and analyzed. Along with streamlined feature detection and processing, the latency or delay between image capture and availability of the determined spatial characteristics can be kept to a minimum.

Figure 8:
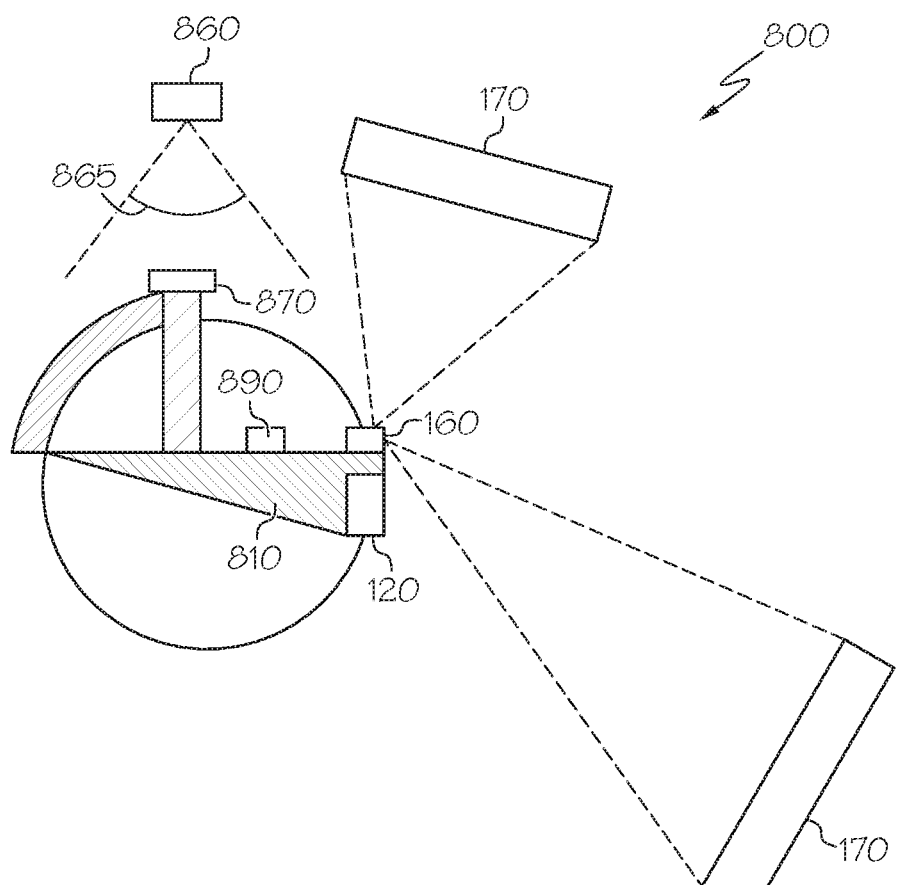
FIG. 8 is a functional block diagram of portions of an NTE system in accordance with another exemplary embodiment.

FIG. 8 is a functional block diagram of portions of an NTE system 800 in accordance with another exemplary embodiment. Unless otherwise noted, the NTE system 800 is similar to the NTE system 100 of FIG. 1, including elements such as the structure display unit 120, NTE drive unit 130, NTE tracker control unit 140, and one or more data sources 180 that may form part of the NTE system 800 but not depicted in FIG. 8. In FIG. 8, camera unit 860 is stationary with respect to operational environment 102, and tracker display unit 870 is mounted on NTE structure 110, and thereby stationary with respect to NTE display unit 120. The spatial characteristics of NTE structure 110 are tracked similarly to the previously described case of camera unit 160 and tracker display unit 170, except for the inverted relationship. The display unit 870 is generally small and lightweight, but the use of a precision spatial light modulator/display again provides significant advantages over discrete devices or passive fiducial markings, in terms of feature size and precision, linearity, and the ability to adjust fiducial symbols based on spatial characteristics of NTE structure 110 or other context-dependent parameters. In the embodiment of FIG. 8, tracker display unit 870 underfills the field of view 865 of camera unit 860. It is preferred that camera unit 860 be a high resolution camera allowing area or region of interest sampling of the captured images.

Another embodiment associated with FIG. 8 includes inertial measurement unit (IMU) 890 mounted to NTE structure 110, in conjunction with camera unit 860 and tracker display unit 870, to form what is sometimes referred to as a hybrid optical tracker system. In an embodiment of this hybrid system, the camera 860 and display unit 870 are used in a "snapshot" truthing mode for IMU 890, as described in U.S. Pat. No. 9,489,045, incorporated herein by reference. In this embodiment, camera unit 860 preferably uses a global shutter mode (as opposed to a rolling shutter mode) as is known in the art, and fiducial symbology is generated to periodically enable rapid or "snapshot" collection of sufficient detail to yield very accurate determination of spatial characteristics, to be compared with synchronized IMU-based result, with any deviation between the two synchronized measurements to be used as input in the correction of IMU drift or other potential sources of error. This high accuracy determination may have a higher latency but is compatible with the snapshot truthing mode of operation. At other times, for example between high accuracy snapshot captured images, the fiducial symbology can be simplified or otherwise adjusted to support streamlined fiducial pattern recognition and thereby reduced latency. In one such embodiment, prediction module 144 is used to predict when tracker display unit 870 will appear near the center of field of view 865 of camera unit 860, where optical resolution and accuracy are expected to be optimal, and initiate the snapshot truthing mode at that time.

In an embodiment of FIG. 8, camera units 160 and 860 are used in combination, along with their associated tracker display units 170 and 870. This supports increased accuracy through the use of multiple vantage points. Fiducial symbology can be adjusted based on whether one or multiple cameras are active and able to capture the displayed symbology. When both are effectively capturing images of their corresponding tracker display units, fiducial symbology for one, e.g. display unit 170, can for example be optimized for sensitivity to angular spatial characteristics, and fiducial symbology for display unit 870 can be tailored to emphasize translational spatial characteristics, such that the combination offers optimal overall accuracy and latency. In other embodiments, additional camera units and tracker display units are included to enhance reliability, accuracy and tracking range.

The use of a flat panel display to provide adjustable fiducial symbols brings many potential benefits as exemplified by the embodiments described thus far. Additional elements that may be used with the context-dependent symbology described above are presented below with reference to FIGS. 9-12. In particular, FIGS. 9-12 depict optical modifiers that may be used with the NTE systems 100, 800 described above. Generally, FIGS. 9-12 depict exemplary relative positions of the camera unit, tracker display unit, and optical modifiers. Unless otherwise noted, the camera unit and tracker display unit described below operate as described above, and descriptions of the other components of the associated NTE system are omitted for clarity.

Figure 9:
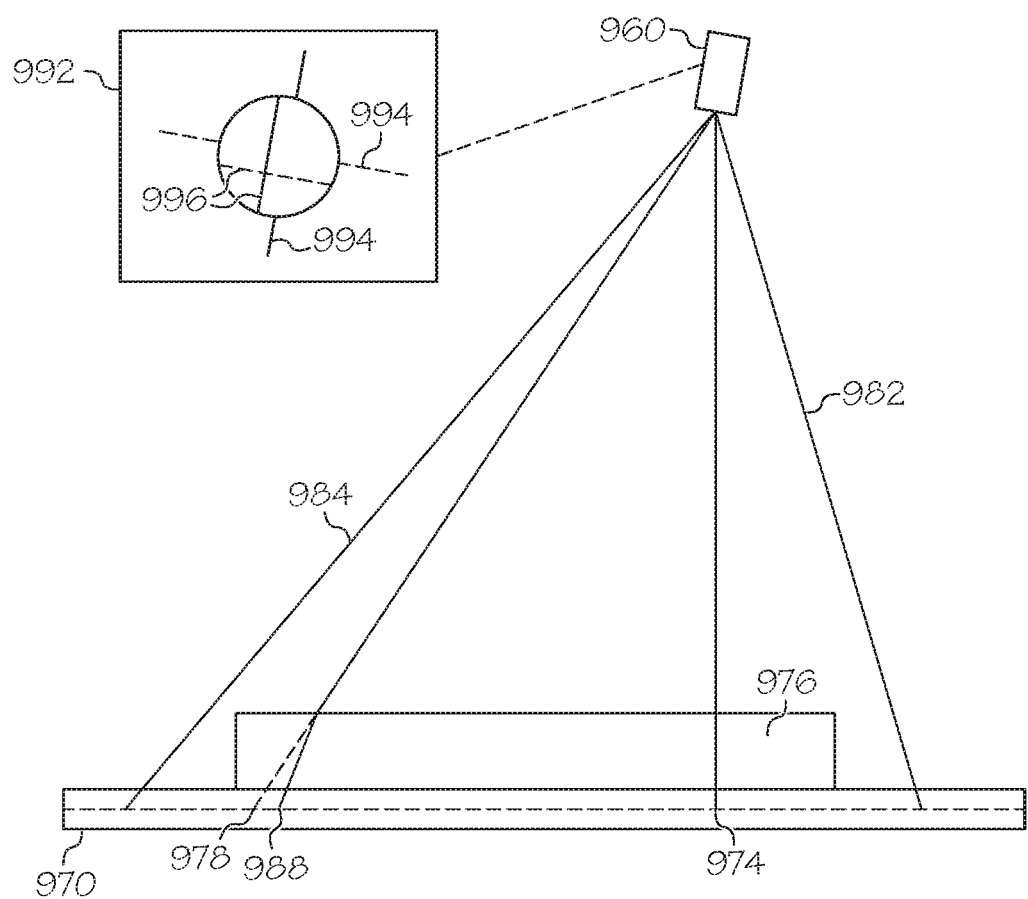
FIGS. 9-12 are functional block diagrams of variations of NTE systems in accordance with exemplary embodiments.

Now referring to FIG. 9, the exemplary embodiment includes an optical modifier 976 between tracker display unit 970 and camera unit 960. As used herein, the term "optical modifier" is defined to be one or more optical elements that are fixed in relation to display unit, e.g. display unit 970, that alter the apparent appearance of a fiducial symbol as captured by the camera unit, e.g., camera unit 960. The optical element(s) forming an "optical modifier" can be refractive, reflective, or a combination thereof. In the embodiment of FIG. 9, optical modifier 976 is a refractive element having parallel surfaces separated by a refractive material such as glass, with refractive index n>1, for example an optical flat, or a lens with zero optical power. The effect of optical modifier 976 is to introduce additional effects, e.g. apparent shifts in position, that vary with the spatial characteristics of the structures being tracked relative to each other. As shown, the presence of optical modifier 976 has no impact on the apparent position of fiducial point 974, but refractive effects cause an apparent shift in the position of fiducial point 988, making it appear to camera unit 960 in this case as if it is at fiducial point 978. Similarly, if camera unit 960 were directly out from point 988, it would be point 974 that would appear shifted.

Refraction effects in transparent display substrates have been mentioned above as a possible source of errors, but the embodiment of FIG. 9 shows that these refraction effects may actually provide useful data, such as depicted, with tracker display unit 970 and the thick substrate exemplified by optical modifier 976. The optical modifier 976 can optionally cover the entire tracker display unit area, or as depicted in FIG. 9, can only have partial coverage. Optical rays 982 and 984 travel from display 970 directly to camera 960 without passing through optical modifier 976. Knowing the geometry enables those differences to be included in any algorithms for pre-processing or post-processing the image data, and may be used to improve the ability to detect small six degree of freedom changes. As an example, inset 992 depicts how a fiducial symbol comprising two orthogonal lines 994 might be captured by camera unit 960. Outside of modifier 976, the lines are directly captured, but in the presence of modifier 976, the lines are shifted, analogous to the shift from point 988 to point 978. The detailed shifts may take many forms, depending upon both the fiducial symbol and the spatial characteristics. In particular, the ability to adjust the fiducial symbol can be leveraged to simplify the analysis, enhance the precision and accuracy, reduce the calculational complexity, or combinations thereof.

Figure 10:
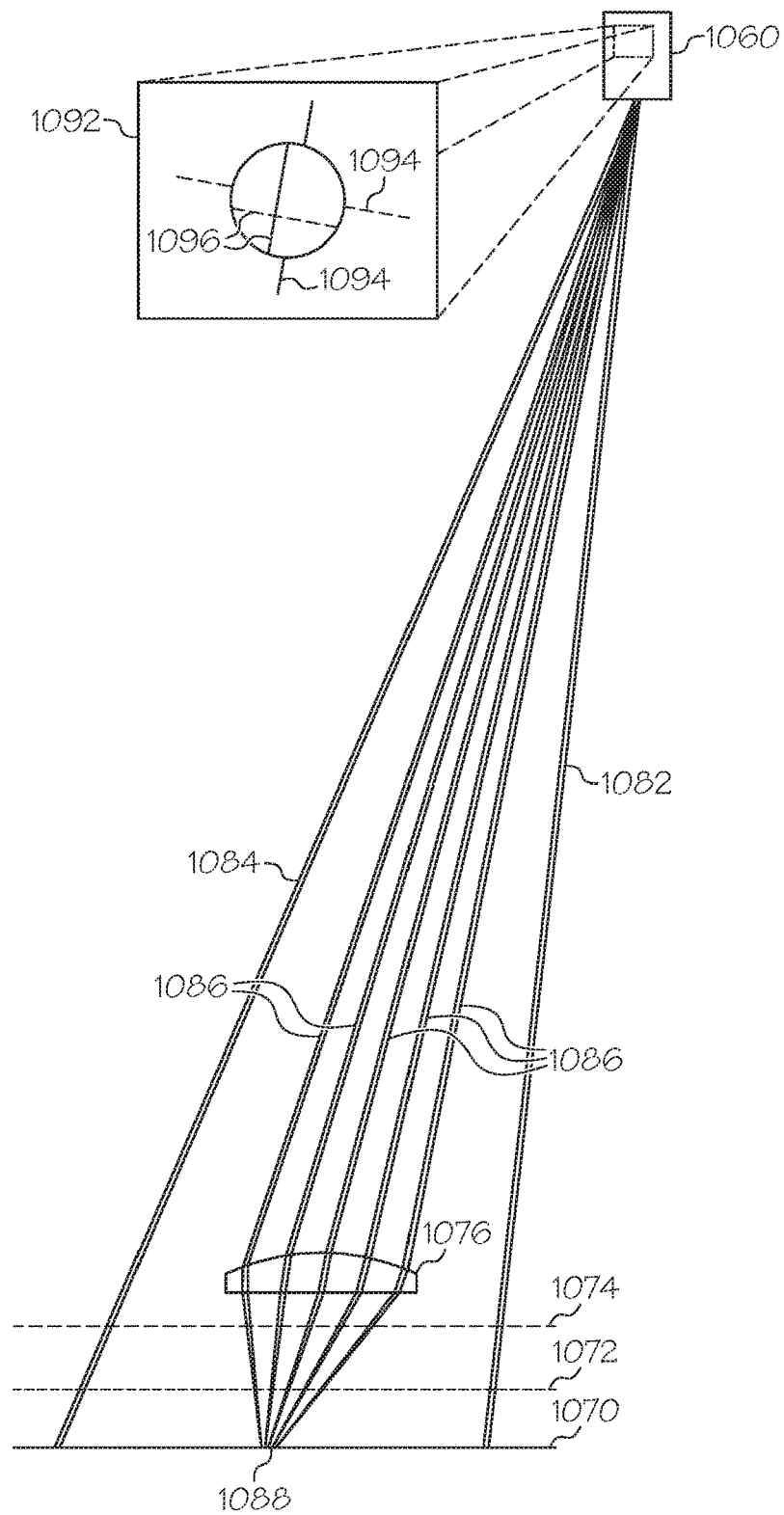

Another embodiment is depicted in FIG. 10 in which an aspheric lens is provided as an optical modifier 1076. An air gap is introduced between optical modifier 1076 and tracker display unit 1070. The optical power of the lens of the optical modifier magnifies the impact of the spatial characteristics. Magnification achievable with a given lens can be selected by choosing the separation, much as with a conventional magnifying glass, for example placing display unit 1070 at display locations 1072 or 1074. As shown, camera unit 1060 is substantially set at infinite focus distance, with corresponding light ray bundles 1086 each comprising parallel rays. The relative magnifications can be seen from the comparison of where the refracted or modified ray bundles intersect the display at locations 1074, 1072 and the display unit 1070 location. In the case of a well-corrected imaging lens as modifier 1076, the display unit 1070 may function as a collimated display, from which collimated fiducial symbols are captured by camera unit 1060. Due to magnification of the fiducial symbols, at least a portion of the potential fiducial symbol(s) may not be visible to the camera unit 1060. This would be the case for fiducial positions other than general position 1088, in the configuration shown. As such, the ability to adjust the fiducial symbol(s), in combination with the prediction module 144, allows the symbol to be placed in an accessible portion of the magnified image. The depicted embodiment also includes ray bundles 1082 and 1084 which bypass the optical modifier 1076, but this is not intended to be limiting.

Inset 1092 of FIG. 10 similarly shows an exemplary view of a fiducial symbol as captured by camera unit 1060. Orthogonal lines 1094 are captured directly, and the corresponding modified lines 1096 are also captured. The effective offsets between the lines depend strongly upon the spatial characteristics, and therefore careful shaping and positioning of the fiducial symbols is important and depends upon the predicted spatial characteristics.

Figure 11:
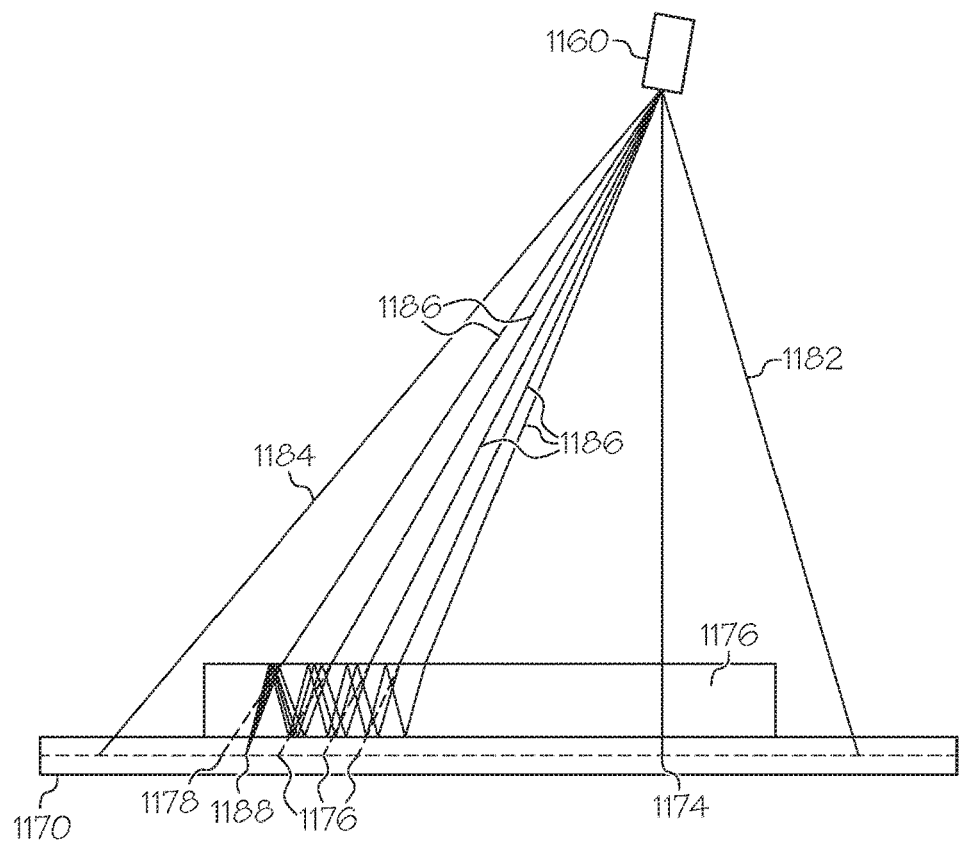

Another optical modifier 1176 is shown in FIG. 11. Optical modifier 1176 is similar to the flat optical modifier 976 of FIG. 9, but here, multiple reflections from the parallel surfaces are considered. The surfaces of modifier 1176 may be uncoated or optionally have coatings which adjust the balance between reflection and transmission at the surfaces. A similar effect may be achieved by using air-spaced partially reflective mirrors or beamsplitters, but FIG. 11 assumes a refractive index n>1. As with FIG. 9, fiducial position 1174 is not impacted by the optical element 1176. Fiducial position 1188 in this case results in multiple apparent fiducial positions, e.g., positions 1178 and 1176, due to optical rays 1186 traveling to camera unit 1160. The optional inclusion of rays 1182 and 1184 again adds enhanced capability for detecting and quantifying the impact of spatial characteristics in the presence of optical modifier 1176.

Figure 12:
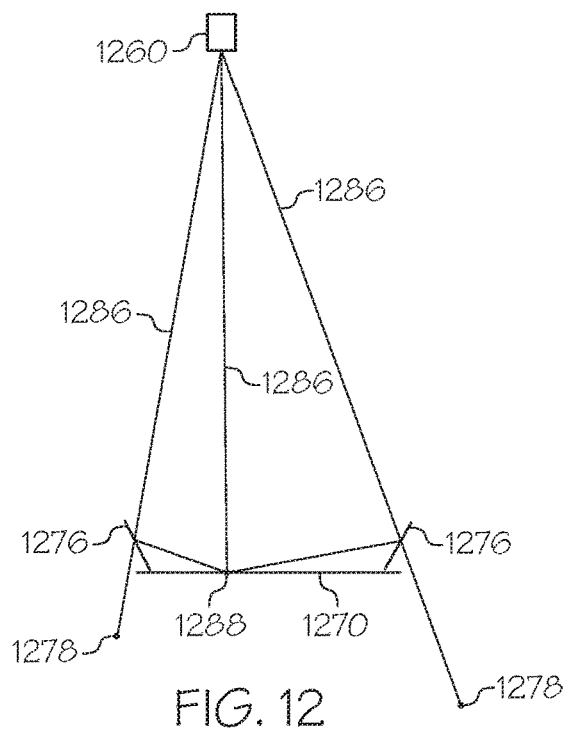

Another exemplary embodiment is shown in FIG. 12. Here, optical modifier 1276 includes two specularly reflective mirrors placed at fixed angles with respect to tracker display unit 1270. Rather than camera unit 1260 detecting a single image of fiducial symbol 1288, multiple images of fiducial symbol 1288 are captured via optical rays 1286. Light emitted or modulated by display unit 1270 at the fiducial symbol 1288 location includes light reflected by optical modifiers 1276, and for the given configuration results in apparent copies of symbol 1288 at locations 1278. As with FIGS. 9-11, these modified and/or additional points provide additional information with which to pre-process or post-process the captured results to determine the spatial characteristics. Each of the embodiments involving optical modifiers effectively introduces data beyond what is available from the planar tracker display units 970, 1070, 1170 and 1270 alone, and enhances the ability to discern small changes in such a multiple degree of freedom tracking scenario. The ability to modify the fiducial symbols in this embodiment allows the system to position the fiducial symbol(s) 1288 such that multiple images 1278 are present and visible to camera unit 1260. Lines and curves can be incorporated into fiducial symbol 1288, and the relationship between symbol 1288 and images 1278 captured and analyzed.

Several types of optical modifiers have been presented, including refractive, reflective and combination elements, and modifiers having optical power and without optical power, but these are not intended to be limiting. Multiple element lenses and other configurations can be used. Optically powered mirror systems can be used, such as introducing a curved mirror surface within the optical flat to make what is known as a "pancake window" collimator. Each of these embodiments further extends the capabilities of the tracker system and can take powerful advantage of the capabilities provided through the use of the tracker display functionality and related modules.

The system and method described herein provides a high precision, high speed, low latency, and relatively lightweight tracking system that enables, for example, accurate and jitter-free registration and rendering of display elements on an NTE display device. Exemplary embodiments discussed herein provide relatively high precision and repeatability, thereby additionally resulting in increased accuracy resulting from recognition and compensation of inaccuracies on an ongoing basis. Generally, the use of an active matrix display enables enhanced precision, stability, and visibility. For example, in conjunction with the active management of the fiducial symbols, such displays enable separation of fiducial characteristics that are significantly larger than the uncertainty associated with the detection, thereby enabling high precision with a smaller separation.

The exemplary embodiments described herein leverage context-specific fiducial symbols to track the orientation and location of a first object relative to a second object, for an example, an object with regard to a platform. This approach provides high accuracy, very low latency (for example, sub-millisecond), reduced form factor, simplified installation, tolerance of metallic structures, and reduced cost. Exemplary embodiments include providing feedback of movement to a movement actuator, displaying information including symbols and graphics such as conformal images on a near-to-eye display worn by a pilot and based on movement of the pilot's head, display systems such as displays in sea going vessels, and displays used by off-site controllers, e.g., ground controllers, based on movement of the user's head, or possibly a remote pilot's head. Many other display applications can also benefit from tracking capabilities. Embodiments enable the continual adjustment of fiducial symbols to optimize tracker performance, for example with respect to easy feature detection, streamlined analysis, translational vs. orientational sensitivity, redundancy, directional sensitivity, etc.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules)

may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical tracker system for tracking a location and orientation of a first object within an operational environment, comprising:
 a processor programmed to implement a prediction module that determines a predicted location and orientation of the first object as a spatial prediction;
 a display module implemented by the processor, the display module coupled to receive the spatial prediction, the display module configured to generate display commands for a fiducial symbol based on the spatial prediction;
 a tracker display unit arranged within the operational environment and separated from the first object, the tracker display unit coupled to the prediction module and configured to receive the display commands, the tracker display unit configured to display the fiducial symbol based on the display commands;
 a camera unit mounted on the first object and configured to capture an image of the fiducial symbol displayed on the tracker display unit as a captured appearance of the displayed fiducial symbol; and
 a position determination module implemented by the processor, the position determination module coupled to the camera unit and configured to receive the image of the fiducial symbol from the camera unit, the position determination module configured to identify the fiducial symbol and determine the location and the orientation of the first object based on the captured appearance of the displayed fiducial symbol.

2. The optical tracker system of claim 1, wherein the tracker display unit is an active matrix display device.

3. The optical tracker system of claim 2, wherein the tracker display unit is formed on a single substrate.

4. The optical tracker system of claim 1, wherein the display module is configured to display the fiducial symbol on the tracker display unit with a nominal appearance from the perspective of the spatial prediction.

5. The optical tracker system of claim 1, wherein the position determination module is configured to compare the captured appearance of the fiducial symbol to the nominal appearance to determine the location and orientation of the first object.

6. The optical tracker system of claim 1, wherein the position determination module is configured to determination the location and orientation of the first object with six degrees-of-freedom (DOF).

7. The optical tracker system of claim 1, further comprising a structure configured to be disposed on a head of a subject as the first object.

8. The optical tracker system of claim 1, further comprising:
 a structure configured to be disposed on a head of a subject as the first object; and
 a structure display unit mounted on and moveable with the structure.

9. The optical tracker system of claim 1, wherein the display module is configured to display the fiducial symbol on the tracker display unit as a grid of intersecting lines with a non-symmetrical feature.

10. The optical tracker system of claim 1, wherein the display module is configured to display the fiducial symbol on the tracker display unit as a nested pair of rotated fiducial symbols.

11. The optical tracker system of claim 1, further comprising an optical modifier interposed between the tracker display unit and the camera unit configured to alter an appearance of the fiducial symbol for the image of the camera unit.

12. The optical tracker system of claim 11, wherein the optical modifier includes at least one of a refractive element, an aspheric lens, multiple parallel reflective surface elements, or a plurality of specularly reflective mirrors.

13. A method for tracking a location and orientation of a first object with an optical tracker system, the method comprising:

determining a predicted location and orientation of the first object within an operational environment as a spatial prediction;

generating display commands for a fiducial symbol based on the spatial prediction;

displaying the fiducial symbol based on the display commands on a tracker display device, wherein the tracker display device disposed within the operational environment and separated from the first object;

capturing, from a location and orientation on the first object, an image of the fiducial symbol displayed on the display device as a captured appearance;

identifying the fiducial symbol in the image; and determining the location and the orientation of the first object based on the captured appearance of the displayed fiducial symbol.

14. The method of claim 13, wherein the tracker display unit is an active matrix display device.

15. The method of claim 13, wherein the displaying step includes displaying the fiducial symbol on the tracker display unit with a nominal appearance from the perspective of the spatial prediction, and wherein the determining step includes comparing the captured appearance of the fiducial symbol to the nominal appearance to determine the location and orientation of the first object.

16. The method of claim 13, wherein the determining step includes determining the location and orientation of the first object with six degrees-of-freedom (DOF).

17. The method of claim 13, further comprising positioning the first object on a structure configured to be disposed on a head of a subject, wherein the capturing step is performed by a camera unit mounted on and moving with the structure.

18. The method of claim 13, wherein the displaying step includes displaying the fiducial symbol on the tracker display unit as a nested pair of rotated fiducial symbols.

19. A near-to-eye display system, comprising:

an optical tracker system for tracking a location and orientation of a first object, comprising a first display unit comprising an active matrix display device, the first display unit positioned at a fixed location and disposed separate from the first object and configured to display a fiducial symbol based on first display commands;

a camera unit mounted on the first object and configured to capture an image of the fiducial symbol displayed on the first display unit as a captured appearance of the displayed fiducial symbol; and a processor implementing a position determination module and coupled to the camera unit, the processor implemented position determination module coupled to receive the image from the camera unit and configured to (i) identify the fiducial symbol and (ii) determine the location and the orientation of the first object based on the captured appearance of the displayed fiducial symbol;

a drive unit coupled to the optical tracker system and configured to generate second display commands based on the location and the orientation of the first object; and a second display unit coupled to the drive unit and configured to render symbology based on the second display commands for viewing by a user relative to a surrounding environment whereby the user may view the rendered symbology in appropriate positions.

20. The near-to-eye display system of claim 19, wherein the processor further implements:

a prediction module that is configured to determine a predicted location and orientation of the first object as a spatial prediction; and a display module that receives the spatial prediction and generates the first display commands for the fiducial symbol based on the spatial prediction.

* * * * *